(12) United States Patent
Sinelnikov et al.

(10) Patent No.: US 7,860,794 B2
(45) Date of Patent: Dec. 28, 2010

(54) METHOD FOR ORIGINATING A BANK DEPOSIT

(76) Inventors: Alexander Mikhailovich Sinelnikov, 1-y Botkinsky pr., 4-35, Moscow (RU) 125284; Alexander Evgenievich Zelenov, ul. Petrozavodskaya, 2/9-253, Moscow (RU) 125502

( * ) Notice: Subject to any disclaimer, the term of this patent is extended or adjusted under 35 U.S.C. 154(b) by 0 days.

(21) Appl. No.: 11/816,931

(22) PCT Filed: Sep. 16, 2005

(86) PCT No.: PCT/RU2005/000469

§ 371 (c)(1),
(2), (4) Date: Aug. 23, 2007

(87) PCT Pub. No.: WO2006/096090

PCT Pub. Date: Sep. 14, 2006

(65) Prior Publication Data

US 2008/0154788 A1 Jun. 26, 2008

(30) Foreign Application Priority Data

Mar. 9, 2005 (RU) ............................... 2005106123

(51) Int. Cl.
*G06Q 40/00* (2006.01)
(52) U.S. Cl. ...................................................... 705/42
(58) Field of Classification Search .................. 705/42
See application file for complete search history.

(56) References Cited

U.S. PATENT DOCUMENTS 5,787,402 A * 7/1998 Potter et al. .................. 705/37
2001/0056398 A1 * 12/2001 Scheirer ....................... 705/38
2008/0077530 A1 * 3/2008 Banas et al. ................. 705/50

FOREIGN PATENT DOCUMENTS

JP 2002298060 10/2002

OTHER PUBLICATIONS

Markowitz, M.H., Foundations of Portfolio Theory, 46 J. Finance (1991) (10 pages).
English Translation of Abstract of JP2002298060 (1 page).
Translation of JP2002-298060 to English (27 pages).

* cited by examiner

*Primary Examiner*—James Kramer
*Assistant Examiner*—Lindsay M. Maguire
(74) *Attorney, Agent, or Firm*—Dinsmore & Shohl LLP

(57) ABSTRACT

A method for originating a bank deposit with the use of a computer is suggested, which implies entering the deposit characteristics into a computer. Use of the method makes it possible to achieve a technical result in the form of increase of the effectiveness of the origination of a bank deposit, improvements of the visualization and availability of the data presented to the bank customer, and enhancements of the functional characteristics of the method. The technical result is achieved due to the bank deposit being originated out of two or more currencies, the costs of which are correlated to the independent unit of deposit cost. The proportions of the currency components in the deposit are then calculated, which give such a ratio between the deposit risk and yield that is optimum from the point of view of preserving and/or increasing the deposit value.

12 Claims, 1 Drawing Sheet

METHOD FOR ORIGINATING A BANK DEPOSIT

CROSS REFERENCE TO RELATED APPLICATIONS

The present application claims priority to co-pending PCT Application Ser. No. PCT/RU2005/000469, filed Sep. 16, 2005, and entitled "Method for Forming a Bank Deposit," and also to co-pending Russian Application Ser. No. 2005106123, filed Mar. 9, 2005, and entitled "Method for Originating a Bank Deposit," both of which are hereby incorporated by reference.

BACKGROUND

1. Field of the Invention

The invention relates to computer engineering, and more specifically to the methods of handling electronic digital data and computational results, methods which are applied to perform some financial operations.

2. Background

There is a method known for automated execution of financial transactions involving several currencies, which is described in U.S. Pat. No. 5,787,402, entitled "Method and System for Performing Automated Financial Transactions Involving Foreign Currencies" (issued Jul. 28, 1998 to Potter et al.). The similarity of the known method with the suggested method is in that both methods, in similar financial activities, make use of several currencies that are correlated with each other according to the current exchange rates. Meanwhile, the known method is aimed at performing automated financial transactions using network resources, and not at the method of optimizing the currency ratio while executing a financial transaction.

A method for originating a bank deposit that presumes, in particular, entering deposit data into a computer is the method most similar to the one described, as it relates to the technical substance and the result achieved. This method for originating a bank deposit is described in Japanese Patent Publication No. 2002-298060, entitled "Deposit Processing Model" (published Oct. 11, 2002). A substantial drawback of this known method is that it cannot be used to originate a bank deposit that includes several currencies such that the proportions of the currencies in the deposit are optimized so as to preserve and/or increase the deposit value.

SUMMARY

A deposit can be defined as a banking product that is characterized by an owner, the amount of the deposit, the currency of the deposit, a term of the deposit, an interest rate, and other additional characteristics. By a multicurrency deposit, a deposit is denoted in the present description that has two or more currencies, each with a corresponding interest rate. Other characteristics of the described multicurrency deposit coincide in the sense with those of a bank deposit in general.

From a computer engineering standpoint, a deposit is an abstract data type that implements said concept of a deposit through a particular programming language. Below, the deposit concept will be interpreted from the computer engineering point of view, satisfying the economic definition of a deposit (or a bank deposit) with the technical content.

The problem that is faced when originating a bank deposit is how to take into account fluctuations of exchange rates in relation to a given standard (for instance, a troy ounce of gold), and how to use these relatively independent currency fluctuations to preserve and/or increase the value of the deposit. The proposed method is a technical solution implemented with a computer and necessary software products. The essence of this solution is in that a bank deposit is originated using several currencies, wherein the proportions of the deposit represented by each currency are selected so as to provide an optimum ratio between risk and deposit yield. The proportions of the currencies in the deposit can be adjusted at a given time interval, with the fluctuations of the currencies' exchange rates taken into consideration relative to a given standard, for instance a troy ounce of gold. Below, we will call this standard an independent unit of deposit cost.

The inventive conception, which is the basis of the proposed method, is directed to the following main purposes: 1) an increase in the reliability and validity of the bank deposit origination procedure, 2) improvement of the visualization and availability of data concerning a deposit, which are presented to the customer upon the deposit proposal and the deposit contract executing (primary bank deposit origination) as well as at stages when the depositor submits a request to the bank to change the characteristics of an existing bank deposit (secondary bank deposit origination), 3) functional enhancement of the method and increased convenience resulting from the ability to apply the method to any set of two or more currencies, and 4) increased effectiveness of the origination of a bank deposit, in particular a) increase in the actual yield of the deposit, b) decrease in risk while managing the deposit, and c) less time for originating a bank deposit using several currencies (taking into account the achieved reliability and validity of this procedure, its visualization, convenience, and functional enhancement).

BRIEF DESCRIPTION OF THE FIGURES

For a detailed description of exemplary embodiments of the invention, reference will now be made to the accompanying drawings in which FIG. 1. shows an example of the efficient frontier of the multicurrency deposit. The ratios between the mean-square deviation, $\sigma_{c(t)}$, (horizontally) and the expected yield, $P(w_{v_1} \ldots w_{v_n})$, (vertically) for multicurrency portfolios with different composition are described. The shown curve establishes the upper limit of possible values and thus presents the efficient frontier of a multicurrency deposit (the term "efficient frontier" is used, for example, by Markowitz (M. H. Markowitz, *Foundations of portfolio theory*, 46 J. Finance 469, n. 2 (1991), hereinafter "Markowitz")). The extreme left point on the curve (point 1) corresponds to the minimum mean-square deviation, and the extreme right point (point 2) corresponds to the maximum mean-square deviation on the deposit. Thus point 1 corresponds to the first variant of the embodiment of the invention, i.e., to the minimization of the risk of the multicurrency deposit losses.

DETAILED DESCRIPTION

Figure 1:
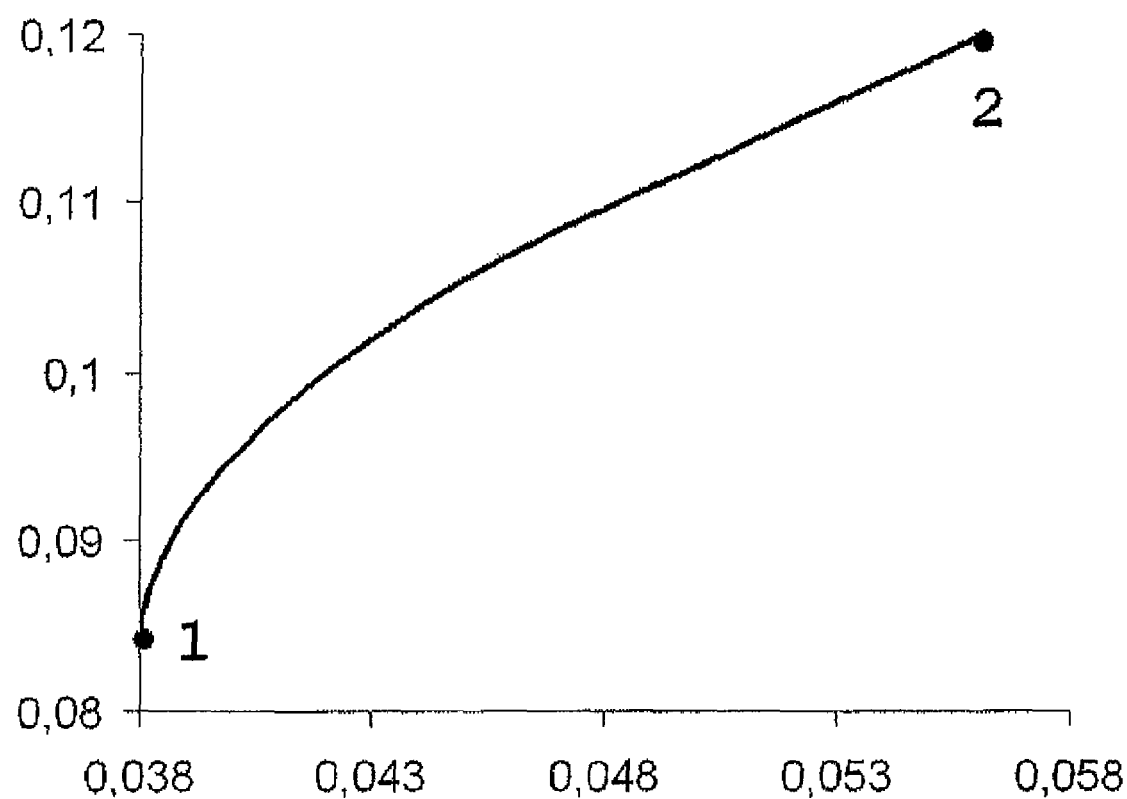

The method is embodied in the following way. When a customer submits a request to the bank, deposit characteristics are entered into a computer. For instance, any of the following points or their combination is entered into a computer: a) the customer's last name, first name, and patronymic name, b) the customer's last name and initials, c) the customer's pseudonym, d) the customer's identification code, e) the amount of the deposit in one or several currencies, f) the term of the deposit, g) another characteristic of the deposit.

The deposit is originated, using the computer, out of two or more currencies. The cost of each deposit currency (taking into account their proportion in the deposit and the absolute amount of each currency proportion in the deposit) is expressed in independent units of deposit cost. An independent unit of the multicurrency deposit cost may be any of the following or any combination of the following: a) the cost of a troy ounce of gold, b) the cost of another mass or volume unit of gold, c) the cost of a mass or volume unit of another precious metal, d) the cost of a floor space unit of residential real estate, e) the cost of an equivalent product, f) another independent unit of deposit cost. For instance, if an independent unit of deposit cost is the cost of a troy ounce of gold, and the deposit is originated out of two currencies (the Russian rouble and the Euro), the deposited funds of the multicurrency deposit are converted into a troy ounce of gold equivalent, two currencies being reduced thereby to one standard. As a result, the deposit acquires a "golden filling"—the deposit cost is correlated with the cost of gold. Specifically, the amount of a deposit may be equated to five troy ounces of gold, and the amount of the deposit may be originated by depositing Russian roubles and Euros in equal cost proportion, or with a prevailing proportion of either the Russian rouble or the Euro.

The deposit proportion of each currency is then calculated with the use of a computer so that the ratio between the risk and the deposit yield is optimized from the point of view of preserving and/or increasing the deposit value. This ratio between the risk and yield is calculated by a deposit cost function. Optimum deposit currency proportions are those that result in a maximum yield under a specified risk of loss in value during the term of the deposit. The risks of the losses are evaluated through mean-square deviation of a deposit cost function, $\sigma_{c(t)}$, according to the method applied in the modern portfolio theory, as described by Markowitz. The search for the $\sigma_{c(t)}$ optimum can be made using the computer also according to the method applied in the modern portfolio theory (Markowitz). Some other known optimization methods used in applied mathematics and computer engineering can be employed while solving this task.

The following formula can be used to calculate the function of the deposit cost, c(t):

$$c(t) = w_{V1} \frac{v_1(0)}{v_1(t)}\left(1 + \frac{P_{V1} \cdot t}{100 \cdot k}\right) + \qquad (1)$$
$$w_{V2} \frac{v_2(0)}{v_2(t)}\left(1 + \frac{P_{V2} \cdot t}{100 \cdot k}\right) + \ldots + w_{Vn} \frac{v_n(0)}{v_n(t)}\left(1 + \frac{P_{Vn} \cdot t}{100 \cdot k}\right),$$

where c(0)=1;

$w_{v_1}, w_{v_2}, \ldots, w_{v_n}$ are the currency weights (proportions of currency components) in a deposit, $w_{v_1}+w_{v_2}+\ldots+w_{v_n}=1$;

$v_1(0), v_2(0), \ldots, v_n(0)$ are the costs of one independent unit of deposit cost represented in deposit currencies (specifically, of one troy ounce of gold) at the point in time when the bank deposit is originated;

$v_1(t), v_2(t), \ldots, v_n(t)$ are the current costs of one independent unit of deposit cost (specifically, of one troy ounce of gold) represented in deposit currencies;

$P_{v_1}, P_{v_2}, \ldots, P_{v_n}$ are the interest percentages established by the bank for the deposit currencies (this parameter P is also entered into the computer while originating the bank deposit and is presented as a portion of unity or as a percentage);

t is time (days); and k, number of days in a year (k=365; in a leap-year k=366).

Function c(t) is a normalized function of random variables $v_1(t), v_2(t), \ldots, v_n(t)$ and represents a multicurrency deposit expressed in independent units of deposit cost (for instance in troy ounces of gold), the deposit whose currency proportions change during the term of the deposit. The deposit normalization represents converting its cost, at the time of the primary deposit origination, to an independent unit of deposit cost.

In a particular case, a deposit can be originated out of three currencies, such as the Russian rouble, the US dollar, and the Euro. Then the deposit cost function is calculated according to the following formula:

$$c(t) = w_{V1} \frac{v_1(0)}{v_1(t)}\left(1 + \frac{P_{V1} \cdot t}{100 \cdot k}\right) + \qquad (2)$$
$$w_{V2} \frac{v_2(0)}{v_2(t)}\left(1 + \frac{P_{V2} \cdot t}{100 \cdot k}\right) + w_{V3} \frac{v_3(0)}{v_3(t)}\left(1 + \frac{P_{V3} \cdot t}{100 \cdot k}\right),$$

where $v_1, v_2, v_3$ are Russian roubles, US dollars, and Euros (in any sequence).

The deposit also can be originated out of two currencies, for instance Russian roubles and Euros. Then the deposit cost function is calculated according to the formula:

$$c(t) = w_{V1} \frac{v_1(0)}{v_1(t)}\left(1 + \frac{P_{V1} \cdot t}{100 \cdot k}\right) + w_{V2} \frac{v_2(0)}{v_2(t)}\left(1 + \frac{P_{V2} \cdot t}{100 \cdot k}\right), \qquad (3)$$

where $v_1, v_2$ are Russian roubles and Euros (in any sequence).

Thus, the objective when originating the multicurrency deposit is to determine, with the use of a computer, the optimum proportions of the currency components in the deposit $w_{v_1}, w_{v_2}, \ldots, w_{v_n}$ taking into account the prehistory of fluctuations in the currency exchange rates against the chosen independent unit of deposit cost (in particular, against gold).

On the basis of described calculations, a computer forms and prints a personalized deposit offer for the customer.

The resulting multicurrency deposit may be periodically adjusted, at a required time interval, based upon the ratio between the currencies' cost and the independent unit of deposit cost (for instance, a troy ounce of gold). The proportions of currencies in the deposit are changed at any of the following frequencies: a) daily, b) weekly, c) once per ten days, d) monthly, e) quarterly, f) once per six months, g) annually, or h) with any other frequency. Thus the bank deposit origination is regarded in the present description from two points of view: 1) the bank deposit origination when establishing an account, and/or 2) bank deposit origination in an existing account, wherein the proportions of the currencies within the bank deposit are adjusted according to the currencies cost as referenced against gold. The mentioned manifestations of the whole process of originating a bank deposit can respectively be called primary and secondary bank deposit origination.

The process of originating the bank deposit is repeated if needed. Thus all stages of the method are executed more than once. In such a case performed more than once are those actions performed under any of the following circumstances: 1) primary bank deposit origination, 2) secondary bank deposit origination, or 3) primary and secondary bank deposit origination.

The method can be implemented with the use of one or more computers. If two or more computers are used, they can work independently or can be organized in a network to form the client-server architecture of the present invention realization.

By way of a more detailed description of the method implemented with the use of the computer, it should be mentioned that a computer converts the entered characteristics of the deposit into an internal representation expressed as the independent units of deposit cost. Further, data about the deposit yield of each deposit currency are entered into a computer, for example, in the form of the yield established by the bank for the currencies of the deposit. A computer saves the deposit characteristics in any of the following storage devices, or any combination of the devices thereof: a) random access memory, and/or b) external storage device (for instance, a hard disk of the computer). A computer provides access to the saved deposit characteristics whenever needed.

Besides that the computer refers to a database containing the prehistory of currency exchange rate fluctuations relative to the independent unit of deposit cost. Such a database can be of currency quotations relative to a troy ounce of gold in the international exchange.

The computer then calculates the efficient frontier for a multicurrency deposit, the frontier which is a combination of currency portfolios that results in the maximum deposit yield for each given risk value. An example of such an efficient frontier is presented in FIG. 1. After this the computer chooses one or more points in the efficient frontier and determines the ratio between currency components of the deposit corresponding to each of the chosen points of the efficient frontier. The computer then converts the independent unit of deposit cost into deposit currencies for each chosen point of the efficient frontier. At the end of this stage of the bank deposit origination, the computer outputs the obtained characteristics of the multicurrency deposit (for instance, the proportion of each of the currency deposit components and the absolute cost of the currency components) to any of the following: a) a display, b) a printer, c) another output device. In particular, the computer creates and prints the personalized deposit offer for the customer. For example, such a proposal may look like this:

Depositor: I. I. Ivanov

Amount of the deposit (three currencies): 100,000.00 Russian roubles, 500.00 US dollars, 10,000.00 Euros.

Term of the deposit: 2 years.

The depositor is informed of the expected deposit yield and risks of losses. The yield and losses of the multicurrency deposit with the proposed set of characteristics are compared with the expected yield and risks of losses for deposits with different characteristics.

Finally, three main variants of realization can be presented for implementing the present method for use in banking activities:

1. An embodiment of the invention as a technical solution inside a strategy directed towards the minimization of the deposit losses. In this case an objective function of the multicurrency deposit yield is:

$$\sigma_{c(t)} \to \min. \quad (4)$$

The criterion for optimization is the minimization of the losses of deposit.

2. The second variant of the invention embodiment implies minimization of the term of the deposit provided the deposit yield is not less than zero:

$$P(w_{v_1} \ldots w_{v_n}) \cdot t - m \cdot \sigma_{c(t)} \geq 0, \quad (5)$$

where m is the number of sigmas (mean-square deviations of a cost deposit function) taken into consideration when calculating the objective function of the deposit yield (as a rule, m=3). In this case the criterion of optimization is the minimization of the term of deposit provided the objective function of the deposit yield is not less than zero.

3. The third variant of an embodiment of the invention is the maximization of the long-term multicurrency deposit yield. In such a case, the objective function of the deposit yield is defined as follows:

$$P(w_{v_1} \ldots w_{v_n}) \cdot t - m \cdot \sigma_{c(t)} \to \max. \quad (6)$$

The optimization criterion is the maximization of the deposit yield irrespective of such deposit characteristics as t (the term of deposit).

The three described variants of the realization illustrate comprehension of the optimality used in the description and claims of the present invention. At the same time, the given embodiments of the invention are not the only ones possible. Those skilled in the art may find other embodiments that are within the scope of the attached claims. The essence of the invention, nonetheless, is the same.

Any of the issues (including those qualified as characteristics of the present invention) stated in any of the following: a) in the section "Field the invention relates to", b) in the section "Essence of the invention", c) in the abstract—may be and, if need be, will be included in the claims. The latter statement should be considered as an indicator of the necessity to include within the claims the invention characteristics described in the listed sections of the invention description and in the abstract.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method of doing business for originating a bank deposit, comprising:

identifying, by a computer, one or more characteristics of a bank deposit comprising a plurality of currency components;

converting, by the computer, the cost of each of the plurality of currency components to an independent unit of deposit cost, based at least in part upon at least some of the one or more characteristics identified; determining, by the computer, a risk level;

determining, by the computer, proportions of each of the plurality of currency components of the bank deposit, based at least in part upon the relative converted cost of each of the plurality of currency components, which result in a desired ratio between the determined risk level and a yield of the bank deposit;

calculating, by the computer, an efficient frontier of the bank deposit, the efficient frontier comprising the proportions of each of the plurality of currency components that results in a maximum yield for the determined risk level; selecting, by the computer, one or more points of the efficient frontier, and determining the ratio between currency components of the bank deposit corresponding to each of the one or more points of the efficient frontier selected;

converting, by the computer, the cost of one or more currency components of the bank deposit, each of the one or more currency components corresponding respectively to one of the one or more points of the efficient frontier selected, from independent units of cost to units of the respective currency component;

calculating, by the computer, the desired ratio between the determined risk level and the yield of the bank deposit as a function of the deposit cost;

calculating, by the computer, the function of the bank deposit cost at least according to the formula:

$$c(t) = w_{V1} \frac{v_1(0)}{v_1(t)} \left(1 + \frac{P_{V1} \cdot t}{100 \cdot k}\right) + w_{V2} \frac{v_2(0)}{v_2(t)} \left(1 + \frac{P_{V2} \cdot t}{100 \cdot k}\right) + \ldots + w_{Vn} \frac{v_n(0)}{v_n(t)} \left(1 + \frac{P_{Vn} \cdot t}{100 \cdot k}\right),$$

wherein, $c(0)=1$;

$w_{v1}, w_{v2}, \ldots w_{vn}$ comprise currency weights that represent proportions of the plurality of currency components of the bank deposit and $w_{v1}+w_{v2}+\ldots+w_{vn}=1$;

$v_1(0), v_2(0), \ldots, v_n(0)$ comprise costs of one independent unit of deposit cost represented in bank deposit currencies and calculated at a point in time when the bank deposit is originated;

$v_1(t), v_2(t), \ldots, v_n(t)$ comprise current costs of one independent unit of deposit cost represented in the bank deposit currencies;

$P_{v1}, P_{v2}, \ldots, P_{vn}$ comprise interest percentages established by the bank for the plurality of currency components;

t comprises a term in days; and k comprises a number of days per year.

2. The method of doing business of claim 1, wherein converting the cost of each of the plurality of currency components comprises using an independent unit of deposit cost selected from the group consisting of a cost of a troy ounce of gold, a cost of a unit of mass of gold, a cost of a unit of volume of gold, a cost of a unit of mass of a precious metal, a cost of a unit of volume of a precious metal, and a cost of a unit of floor space of residential real estate.

3. The method of doing business of claim 1, further comprising basing the determining of the risk level at least in part upon a standard deviation of the function of the bank deposit cost.

4. The method of doing business of claim 1, further comprising periodically repeating the determining the proportions of the plurality of currency components, wherein the proportions of the plurality of currency components changes over time.

5. The method of doing business of claim 1, wherein identifying one or more characteristics of the bank deposit comprises identifying a characteristic selected from the group consisting of a customer's last name, a customer's first name, a customer's patronymic name, a customer's initials, a customer's pseudonym, a customer's identification code, an amount of the bank deposit, and a term of the bank deposit.

6. The method of doing business of claim 1, further basing the determining of the proportions of each of the plurality of currency components at least upon data representing a history of fluctuations in exchange rates of each of the plurality of currency components.

7. A computer readable medium comprising software that causes a computer to:

identify one or more characteristics of a bank deposit comprising a plurality of currency components;

convert the cost of each of the plurality of currency components to an independent unit of deposit cost, based at least in part upon at least some of the one or more characteristics identified; determine a risk level; determine proportions of each of the plurality of currency components of the bank deposit, based at least in part upon the relative converted cost of each of the plurality of currency components, which result in a desired ratio between the determined risk level and a yield of the bank deposit;

calculate an efficient frontier of the bank deposit, the efficient frontier comprising the proportions of each of the plurality of currency components that results in a maximum yield for the determined risk level;

select one or more points of the efficient frontier, and determine the ratio between currency components of the bank deposit corresponding to each of the one or more points of the efficient frontier selected;

convert the cost of one or more currency components of the bank deposit, each of the one or more currency components corresponding respectively to one of the one or more points of the efficient frontier selected, from independent units of cost to units of the respective currency component;

calculate the desired ratio between the determined risk level and the yield of the bank deposit as a function of the deposit cost;

calculate the function of the bank deposit cost at least according to the formula:

$$c(t) = w_{V1} \frac{v_1(0)}{v_1(t)} \left(1 + \frac{P_{V1} \cdot t}{100 \cdot k}\right) + w_{V2} \frac{v_2(0)}{v_2(t)} \left(1 + \frac{P_{V2} \cdot t}{100 \cdot k}\right) + \ldots + w_{Vn} \frac{v_n(0)}{v_n(t)} \left(1 + \frac{P_{Vn} \cdot t}{100 \cdot k}\right),$$

wherein, $c(0)=1$;

$w_{v1}, w_{v2}, \ldots, w_{vn}$ comprise currency weights that represent proportions of the plurality of currency components of the bank deposit, and $w_{v1}+w_{v2}+\ldots+w_{vn}=1$;

$v_1(0), v_2(0), \ldots, v_n(0)$ comprise costs of one independent unit of deposit cost represented in bank deposit currencies and calculated at a point in time when the bank deposit is originated;

$v_1(t), v_2(t), \ldots, v_n(t)$ comprise current costs of one independent unit of deposit cost represented in the bank deposit currencies;

$P_{v1}, P_{v2}, \ldots, P_{vn}$ comprise interest percentages established by the bank for the plurality of currency components;

t comprises a term in days; and k comprises a number of days per year.

8. The computer readable medium of claim 7, wherein the software further causes the computer to convert the cost of each of the plurality of currency components comprises using an independent unit of deposit cost selected from the group consisting of a cost of a troy ounce of gold, a cost of a unit of mass of gold, a cost of a unit of volume of gold, a cost of a unit of mass of a precious metal, a cost of a unit of volume of a precious metal, and a cost of a unit of floor space of residential real estate.

9. The computer readable medium of claim 7, wherein the software further causes the computer to base the determination of the risk level at least in part upon a standard deviation of the function of the bank deposit cost.

10. The computer readable medium of claim 7, wherein the software further causes the computer to periodically repeat the determination of the proportions of the plurality of currency components, wherein the proportions of the plurality of currency components changes over time.

11. The computer readable medium of claim 7, wherein the identification of one or more characteristics of a bank deposit comprises identification of a characteristic selected from the group consisting of a customer's last name, a customer's first name, a customer's patronymic name, a customer's initials, a customer's pseudonym, a customer's identification code, an amount of the bank deposit, and a term of the bank deposit.

12. The computer readable medium of claim 7, wherein the software further causes the computer to base the determination of the proportions of each of the plurality of currency components at least upon data representing a history of fluctuations in exchange rates of each of the plurality of currency components.

\* \* \* \* \*